United States Patent [19]

Nakayama

[11] 3,746,781

[45] July 17, 1973

[54] VIDEO SIGNAL PHASE REGULATING SYSTEM

[75] Inventor: Masayuki Nakayama, Kanagawa, Japan

[73] Assignee: Sony Corporation, Tokyo, Japan

[22] Filed: Dec. 15, 1971

[21] Appl. No.: 208,146

[30] Foreign Application Priority Data

Dec. 22, 1970 Japan ............................ 45/116489

[52] U.S. Cl. 178/6.6 TC, 178/DIG. 3, 179/15.55 R, 325/56

[51] Int. Cl. ............................................ H04n 7/12

[58] Field of Search .................... 178/DIG. 3, 6.6 A, 178/6.6 TC; 179/15.55 R; 325/56

[56] References Cited

UNITED STATES PATENTS

| | | | |
|---|---|---|---|
| 2,828,478 | 3/1958 | Johnson | 178/6.6 A |
| 3,639,689 | 2/1972 | Doi | 178/6.6 TC |
| 2,836,650 | 5/1958 | Johnson | 178/6.6 A |
| 3,628,149 | 12/1971 | Swan | 325/56 |
| 3,676,583 | 7/1972 | Morita | 178/6.6 TC |

*Primary Examiner*—Howard W. Britton
*Attorney*—Lewis H. Eslinger et al.

[57] ABSTRACT

In a video signal phase regulating system having at least two transmitting lines for transmitting rectangular signals with a predetermined phase relationship to each other, the rectangular signals being produced from an angular-modulated video signals, means for combining the rectangular signals, and means for detecting a phase difference between the rectangular signals in response to alteration of the phase relationship therebetween. The system is further provided with at least one variable delay means connected to one of the transmitting lines and controlled by an output signal derived from the phase difference detecting means. The delay means regulates the rectangular signals to maintain a determined phase relationship between them.

6 Claims, 30 Drawing Figures

PRIOR ART FIG. 1
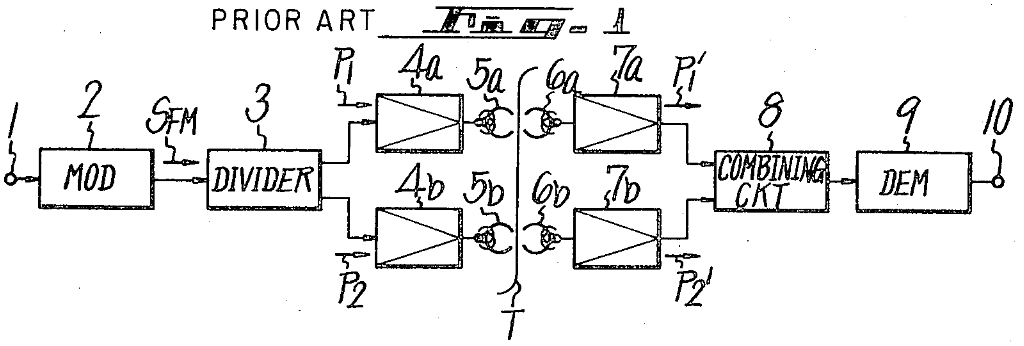
FIG. 6A
FIG. 6B
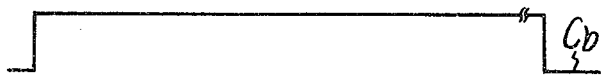
FIG. 6C
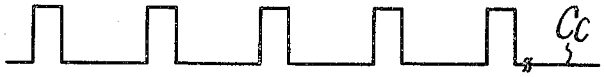
FIG. 6D
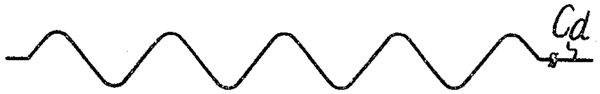
FIG. 6E
FIG. 6F
FIG. 6G
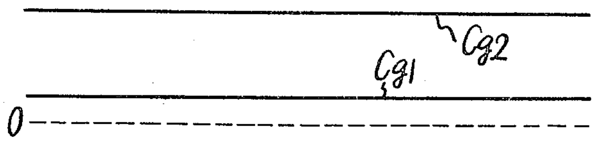
INVENTOR
MASAYUKI NAKAYAMA

INVENTOR

MASAYUKI NAKAYAMA

INVENTOR

MASAYUKI NAKAYAMA

INVENTOR
MASAYUKI NAKAYAMA

INVENTOR
MASAYUKI NAKAYAMA

VIDEO SIGNAL PHASE REGULATING SYSTEM

BACKGROUND OF THE INVENTION

1. Field of the Invention

The invention relates to a video signal phase regulating system, and more particularly to means for regulating a plurality of signals to be of a predetermined phase relationship to each other.

2. Description of the Prior Art

In the art of magnetic recording and reproducing systems, there is a system called a frequency dividing system. In such a frequency dividing system, alternate angular modulated video signals are sampled and divided into two signals of a frequency one-half that of the original video signal and recorded on two tracks on a magnetic tape. These two signals are reproduced by magnetic heads and then combined together to provide the original angular modulated video signal. The theory therefor can be explained as follows.

The angular modulated signal is generally expressed by the following equation:

$$f(t) = Ac \sin(\omega ct + \phi(t)) \tag{1}$$

From the equation (1), $t$ in the case of $f(t) = 0$ is obtained as follows:

$$\omega ct + \phi(t) = N\pi \tag{2}$$

where $n = 0, 1, 2, 3, \ldots$

Considering only the zero points when $n$ is 2, 4, 6, . . . , it follows that $$\omega ct + \phi(t) = 2n\pi \tag{3}$$

The waveform crossing such zero points is expressed by the following equation:

$$f_1(t) = \sqrt{2}\, Ac \sin ½(\omega ct + \phi(t)) \tag{4}$$

Considering only the zero points when $n$ is 1, 3, 5, . . ., it follows that $$\omega ct + \phi(t) = (2n+1)\pi \tag{5}$$

The waveform crossing such zero points is expressed by the following equation:

$$f_2(t) = \sqrt{2}\, Ac \cos ½(\omega ct + \phi(t)) \tag{6}$$

From the above equations (1), (4) and (6) it appears that the above relationship is as follows:

$$f(t) = f_1(t) \times f_2(t) \tag{7}$$

This implies that the angular modulated signal can be divided into two modulated waves phased 90 degrees apart from each other and that the original signal waveform can be obtained with the product of the two signals.

In the event that the angular modulated signal is divided, for example, into two signals and recorded on a magnetic medium, a signal having a frequency bandwidth twice that of the original signal can be obtained in each channel and recording and reproducing with high resolution can be achieved. Of course, the original signal can be divided not only into two signals but also into four signals and eight signals.

In the system described above, when one video signal is divided into two signals, it is absolutely necessary that reproduced signals of the two channels bear a predetermined phase relationship. However, there are some occasions when the predetermined phase relationship cannot be retained between the two reproduced signals due to stretch or shrinkage of the magnetic tape or mistracking during reproducing. In such a case, it is impossible to obtain a composite signal equal to the original one. Especially in the case of a video signal, jitter appears in the reproduced picture, making it impossible to obtain a stable reproduced picture.

SUMMARY OF THE INVENTION

The invention is directed to a phase regulating system for a video signal in which at least one variable delay means is inserted in at least one of a plurality of transmission lines for separately transmitting a plurality of divided angular modulated video signals with predetermined phase differences therebetween the variable delay means is controlled with an output signal derived from a phase difference detecting means, to maintain the divided angular modulated video signals in a correct phase relationship to each other.

Accordingly, one object of the invention is to provide a novel video signal phase regulating system which maintains a plurality of divided angular modulated signals in a predetermined phase relationship to each other.

Another object of the invention is to provide a video signal phase regulating system which regulates the phase relationship of a plurality of angular modulated signals with the use of novel variable delay means.

Still another object of this invention is to provide a video signal phase regulating system in which a carrier leak contained in a synchronizing signal of a video signal is detected and a variable delay means is controlled by the detected output, to regulate the phase relationship of a plurality of angular modulated signals.

Other objects, features and advantages of this invention will become apparent from the following description taken in conjunction with the accompanying drawings.

BRIEF DESCRIPTION OF THE DRAWING

FIG. 1 is a block diagram showing a prior magnetic recording and reproducing system employing the frequency division method;

FIGS. 6A–6G are a series of waveform diagrams, for explaining the operation of the video signal phase regulating system depicted in FIG. 3;

DESCRIPTION OF THE PREFERRED EMBODIMENTS

Figures 2A, 2B, 2C, 2D, 2E, 2F, 2G, 2H:
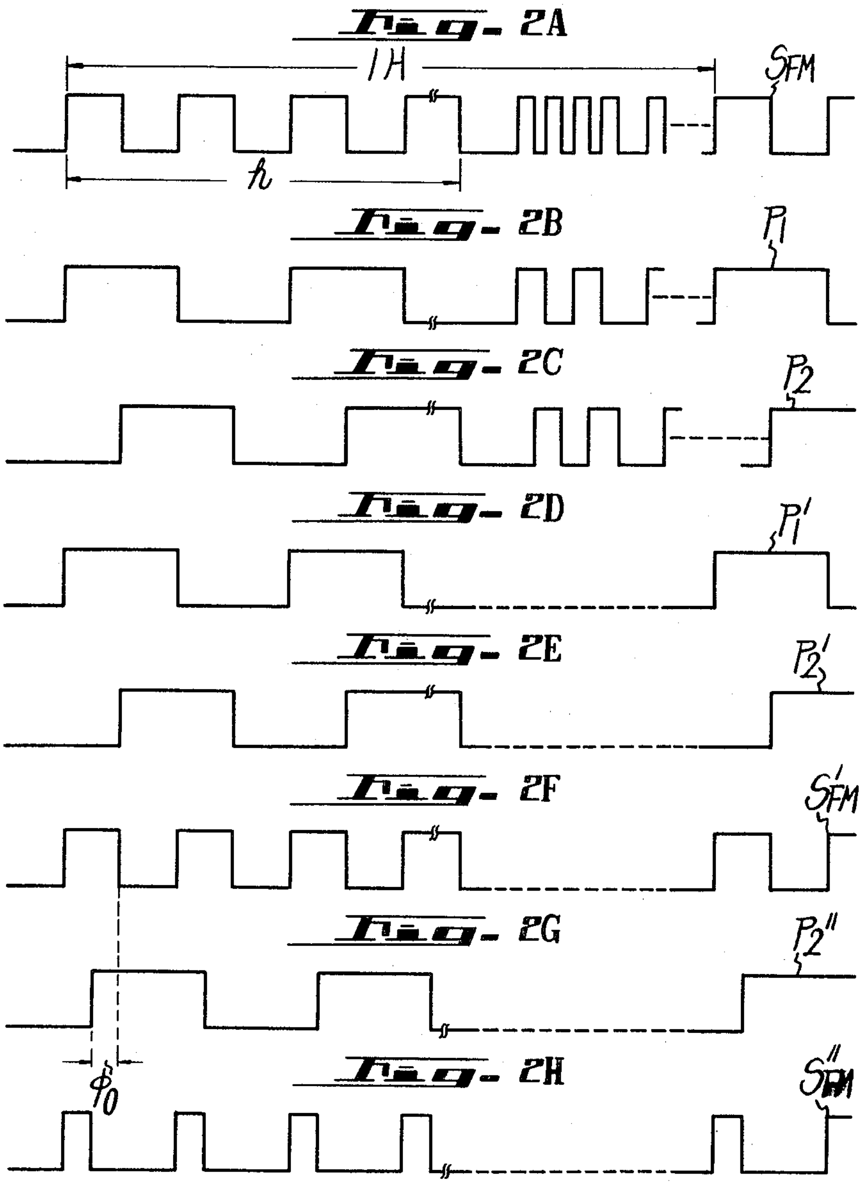
FIGS. 2A–2H illustrates the waveforms of signals produced by the respective blocks of FIG. 1.

For a better understanding of this invention, a description will be given first of a prior magnetic recording and reproducing system which is shown in FIG. 1. In this system a video signal supplied to an input terminal 1 is applied to an angular modulating means 2 including a limiter, in this case a frequency modulator, to derive therefrom a continuous train of rectangular wave signals $S_{FM}$ such as shown in FIG. 2A. The frequency-modulated signal $S_{FM}$ is supplied to a channel divider 3. The channel divider 3 consists of, for example, a pair of flip-flop circuits (hereinafter referred to as an FF circuits). One of the FF circuits is triggered by the leading edge of the frequency-modulated signal $S_{FM}$ to produce a rectangular wave signal $P_1$ such as depicted in FIG. 2B. The other FF circuit is triggered by the trailing edge of the frequency-modulated signal $S_{FM}$ to produce a rectangular wave signal $P_2$ such as depicted in FIG. 2C. In this case, it must be noted that the signals $P_1$ and $P_2$ are accurately phased 90° apart from each other. The signals $P_1$ and $P_2$ are amplified by first and second recording amplifiers 4a and 4b, respectively, and are simultaneously recorded by magnetic recording heads 5*a* and 5*b* on a magnetic tape T while being divided into two channels.

During playback, the recorded frequency-modulated signals $P_1$ and $P_2$ are reproduced as $P_1'$ and $P_2'$ (FIGS. 2D and 2E) by reproducing magnetic heads 6*a* and 6*b*. The signals $P_1'$ and $P_2'$ are amplified by preamplifiers 7*a* and 7*b* respectively and then applied to a combining circuit 8 to be combined with each other to provide one frequency-modulated signal $S'_{FM}$ such as shown in FIG. 2F based on the theory previously described above. The output signal $S'_{FM}$ derived from the combining circuit 8 is demodulated by a demodulator 9 to produce the original video signal at its output terminal 10. In order that the video signal produced at the output terminal 10 may be identical in character with the original video signal, it is absolutely necessary that the rectangular wave signals $P_1'$ and $P_2'$ be of a predetermined phase relationship to each other; in this case they must be displaced 90° apart in phase. When these signals are phased 90° apart, the duty factor of the composite frequency-modulated signal $S'_{FM}$ is 50 percent in one horizontal synchronizing signal period *h* (FIG. 2). In the FIG. 1H represents one horizontal line period.

However, in the event that stretch or shrinkage of the magnetic tape T or mistracking occurs during playback as previously referred to, the reproduced rectangular wave signals cannot be retained in the predetermined phase relationship and the duty factor of the composite frequency-modulated signal $S'_{FM}$ is no longer 50 percent. For example, when the magnetic head 6*b* traces the second channel at a speed higher than a predetermined one, the phase of its reproduced signal, designated by $P_2''$ in FIG. 2G, is advanced, for example, $\phi_0$ relative to the normal reproduced signal $P_2'$. As a result of this, when the normal reproduced signal $P_1'$ and the reproduced signal $P_2''$ are combined together to provide a composite signal $S''_{FM}$ such as depicted in FIG. 2H, an error is introduced in the composite signal $S''_{FM}$ based on the error $\phi_0$ in phase and the signal $S''_{FM}$ becomes different in character from the frequency-modulated signal $S_{FM}$ during recording. Consequently, even if the composite signal $S''_{FM}$ is demodulated and reproduced on the screen of a television receiver, a stable reproduced picture cannot be obtained.

Generally, in the case where the frequency-modulated signal $S_{FM}$ is recorded in the form of two divided signals expressed by $P_1$ and $P_2$, the signals $P_1$ and $P_2$ are of a frequency one-half that of the frequency-modulated signal $S_{FM}$ and are phased 90° apart from each other. Accordingly, in the case where the phase difference between the reproduced signals $P_1'$ and $P_2'$ is just 90° , the duty factor $D_f$ of the frequency-modulated signal derived from the combining circuit 8 is 50 percent (because the sampling position is a synchronizing signal portion as described later in which the frequencies of the signals $P_1'$ and $P_2'$ do not vary).

However, where the phase difference between the reproduced signals $P_1'$ and $P_2'$ is different from 90°, the duty factor $D_f$ of the frequency-modulated signal is not 50 percent and a frequency component different from the carrier frequency of the frequency-modulated signal is generated. This frequency component appears as a carrier leak in the synchronizing signal portion of the demodulated video signal.

The present invention employs means by which, when the reproduced signals are not in the predetermined phase relationship, a deviation in the duty factor of the composite signal based upon the error in phase is detected or a carrier leak appearing in the demodulated signal based upon the error in phase is detected to produce a control signal for regulating the plurality of signals to be of the desired 90° phase relationship.

Figure 3:
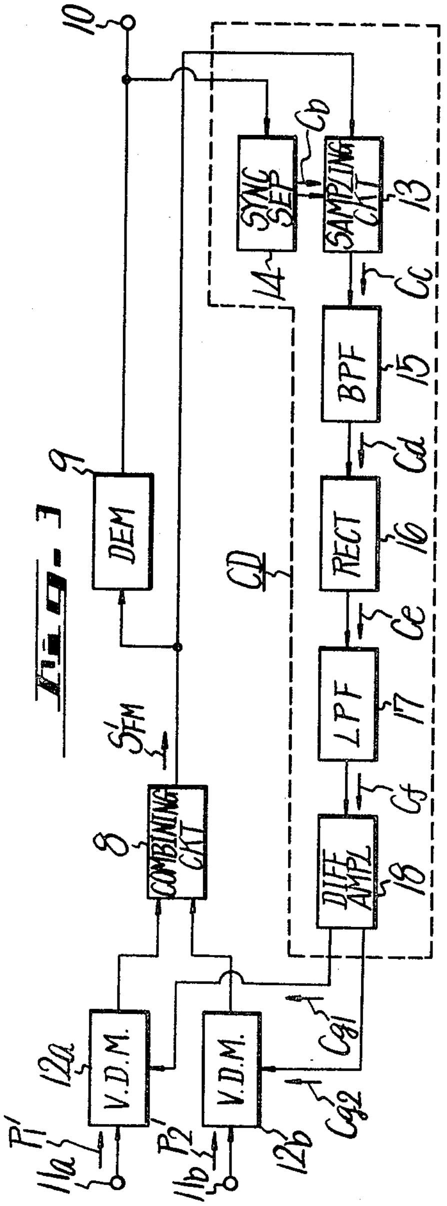
FIG. 3 is a block diagram of a video signal phase regulating system according to one embodiment of the invention.
Figure 4:
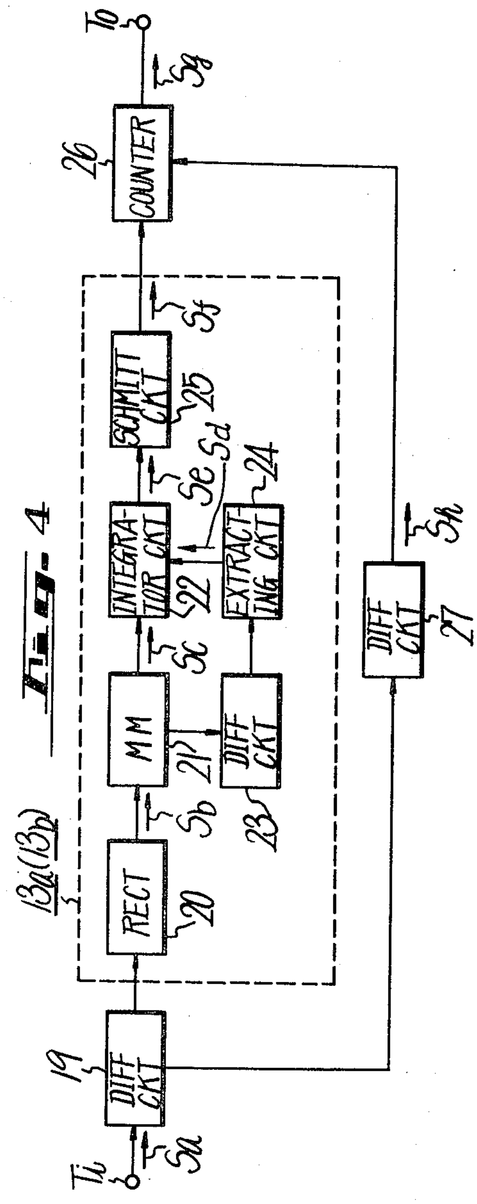
FIG. 4 is a block diagram illustrating variable delay means for use in the embodiment of FIG. 3.

FIG. 3 illustrates one example of this invention. Reference numerals 11*a* and 11*b* designate input terminals which are supplied with the aforementioned signals $P_1'$, and $P_2'$ reproduced from the magnetic tape T, and 12*a* and 12*b* designate variable delay means. The variable delay means 12*a* and 12*b* are constructed as depicted in FIG. 4. In FIG. 4, reference numeral 19 indicates a differentiation circuit, 20 a full-wave rectifier circuit, 21 a multivibrator, 22 an integrator circuit, 23 a differentiation circuit, 24 a first differentiated wave extracting circuit, 25 a Schmitt circuit, and 26 a one-bit counter. Each delay means 12*a* and 12*b* is adapted to be supplied at its input terminal $T_i$ with an frequency-modulated wave, a pulse width modulated wave or like signal having information at the rise and fall of the pulse and is further adapted to produce at an output terminal $T_o$ a delayed signal whose amount of delay is variable. Since the circuits making up the variable delay means are all known, their detailed circuit constructions are omitted.

Figures 5A, 5B, 5C, 5D, 5E, 5F, 5G, 5H:
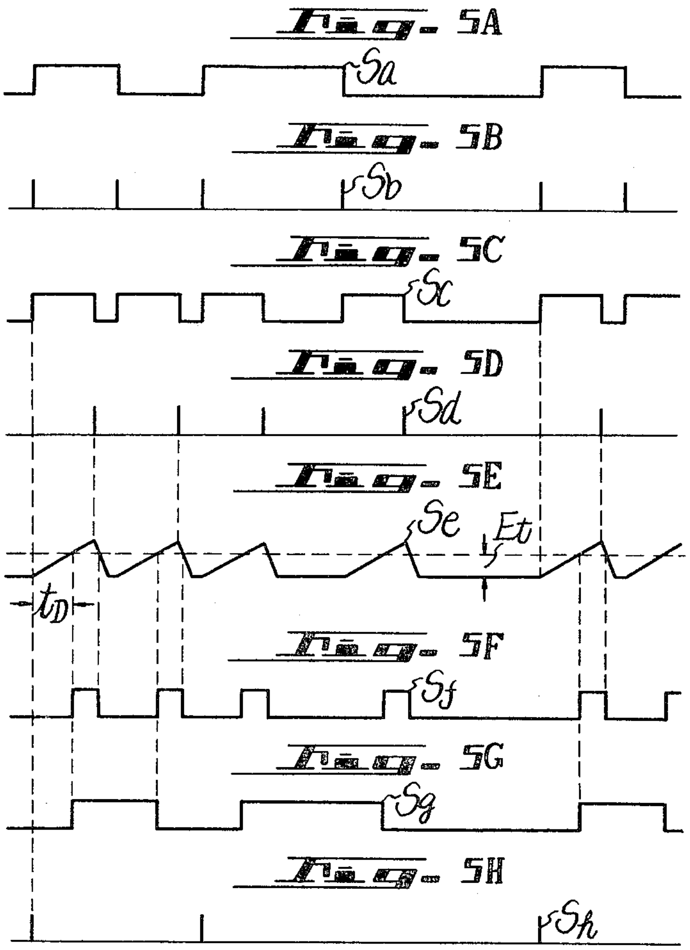
FIGS. 5A–5H are a series of waveform diagrams, for explaining the operation of the variable delay means of FIG. 4.

The frequency-modulated signal designated S*a* in FIG. 5 (regarded as the signal reproduced by the head 6*a*), which is supplied to the input terminal $T_i$, is differentiated by the differentiation circuit 19 and is then rectified the full-wave rectifier circuit 20, by which produces a unipolar signal, designated S*b* in FIG. 5B, having both positive and negative differentiated waves as for example, on the positive side. The differentiated, full-wave rectified signal Sb is applied to the input of the mono-multivibrator 21 which provides a series of output pulses, designated Sc in FIG. 5C, whose widths are is determined by the rise and fall of the frequency-modulated signal Sa, The pulses Sc are next applied to the input of the integrator circuit 22 to produce an integrated output signal designated Se in FIG. 5E.

The pulse Sc is also supplied to the input of the differentiation circuit 23 The output of the differentiation circuit 23 is fed to the input of the the differentiated wave extracting circuit 24 which extracts a trailing edge pulse Sd from the pulse Sc. The pulse 5d is applied to a switching circuit included in the integrator circuit 22 to decrease the time constant of the integrator circuit 22, and thereby to shorten its discharging time.

The trigger level Et of the Schmitt circuit 25 is predetermined and the circuit 25 is triggered at a certain level of the integrated signal Se to derive a pulse Sf therefrom.

The pulse Sf includes at its rising time the information of the original signal Sa and is delayed behind the original signal Sa by a time $t_D$ during which the integrated signal Se reaches the trigger level Et of the Schmitt circuit 25. A delayed signal designated Sg in FIG. 5G, is produced at the output terminal to of a one bit counter 26 by tiggering the counter at the rise of the pulse Sf supplied from the output of the Schmidt circuit 25. A leading edge pulse, designated Sh in FIG. 5H, is extracted from the original signal Sa by a second differentiated wave extracting circuit 27 which is supplied with the differentiated wave output signal from the differentiation circuit 19 The pulse Sh is supplied to the one-bit counter 26 to reset it.

In the manner described above, the frequency-modulated signal is delayed. It will be seen that the delay time $t_D$ can be altered at will by changing the trigger level Et of the Schmitt circuit 7. The outputs from the variable delay means 12*a* and 12*b* are supplied to the combining circuit 8, the output from which is fed the demodualtor 9, whose output is derived at the output terminal 10.

Further, the present invention employs means CD for detecting a phase error between the reproduced ignals to control the variable delay means with the error signal. With reference now more particularly to FIGS. 3 and 6 the means CD includes a sampling circuit 13 which is supplied with the output signal $S'_{FM}$ from the combining circuit 8 and a sync separator 14 which is connected to the aforesaid output terminal 10 the sync separator 14 separates a horizontal synchronizing signal from the video signal and produces an output signal representative of the horizontal synchronizing signal. The output signal from the separator 14 is applied as a gate signal designated to the sampling circuit 13, so that an output signal Cc derived from the sampling circuit 13 is the reproduced composite signal $S'_{FM}$ of the portion corresponding to the horizontal synchronizing signl. The output signal Cc from the sampling circuit 13 is supplied to a bandpass filter 15 which permits the passage therethrough of its fundamental wave component, driving an amplitude-modulated signal designated Cd at its output terminal. The level of the amplitude-modulated signal is in proportion to the duty factor derived from the sampling circuit 13. Thp ampltude-modulated signal C thus obtained is full-wave rectified and amplified by a rectifying amplifier 16 to provide a ripple signal designated Ce and this signal is converted by a low-pass filter 17 into a DC signal designated Cf. This DC signal is supplied to the input of a differential amplifier 18 to derive a differentially changed control signal at its output terminal. The control signal is applied to the input terminals of the means included in the delay means 12*a* and 12*b* for establishing the trigger level of the Schmitt circuit 25.

Figure 8A:
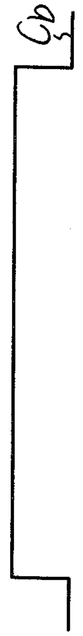
FIGS. 8A–8C are a series of waveform diagrams, for explaining the operation of the embodiment of FIG. 7.

Accordingly, when the reproduced signals are not in the predetermined phase relationship, for example, when the phase of the reproduced signal $P_2''$ is advanced from the predetermined phase as shown in FIG. 2G, the duty factor of the composite signal $S''_{FM}$ produced by the combining circuit is no longer 50 percent as depicted in FIG. 6A. When this signal $S''_{FM}$ is supplied to the sampling circuit 13, the portion of the composite signal $S''_{FM}$ corresponding to the synchronizing signal is sampled by the horizontal synchronizing signal derived from the sync separator 14, that is, the gate signal Cb shown in FIG. 6B. This signal is indicated by Cc in FIG. 6C. The signal Cc is supplied to the bandpass filter 15 to extract its fundamental wave component such as depicted in FIG. 6D, which is converted by the rectifier-amplifier 16 into a ripple signal Ce such as shown in FIG. 6E. The signal Ce is rendered by the low-pass filter 17 into a DC signal Cf illustrated in FIG. 6F, which is supplied to the differential amplifier 18. Here, it must be noted that the level of the signal Cc derived from the bandpass filter 15 is proportional to the duty factor of the reproduced composite signal. Consequently, when the duty factor is less than 50 percent as shown in FIG. 8A, the level of the bandpass filter 15 is lower that that when the duty factory is 50 percent. According, the level of a control signal $Cg_2$ derived from the differential amplifier 18 becomes higher than that of the other control signal $Cg_1$, so that the trigger level of the Schmitt circuit 25 included in the delay means 12*b* rises and the delay means 12*b* provides a signal whose phase is further delayed. Since the trigger level of the Schmitt circuit 25 included in the other delay means 12*a* becomes lower relative to the trigger level of the Schmidt circuit 25 included in the delay means 12*b*, the delay means 12*a* produces a signal whose phase is further advanced. Thus, when the phase difference between the differentially changed signals $P_1'$ and $P_2'$ has reached 90°, the control signals $Cg_1$ and $Cg_2$ from the differential amplifier 18 become equal in level to each other, so that the relative movement of the phase stops.

In the event that the reproduced signal $P_1'$ has advanced relative to the reproduced signal $P_2'$ in excess of the predetermined phase difference therebetween, the relationship between the levels of the control signals $Cg_1$ and $Cg_2$ is the reverse of that in the above case. Accordingly, it will be readily understood that the delay means 12*a* and 12*b* also perform the opposite operations to those mentioned above to thereby maintain the both signals $P_1'$ and $P_2'$ in the predetermined phase relation.

Figure 7:
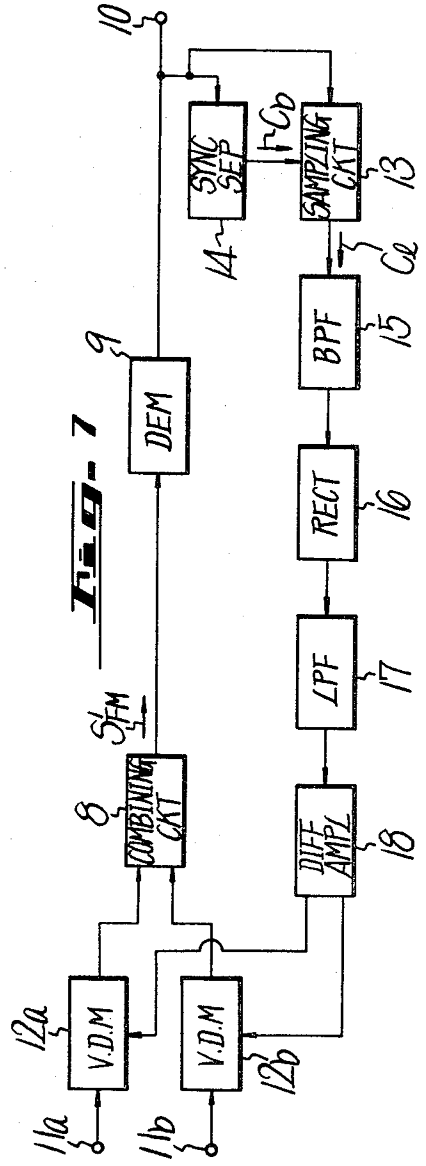
FIG. 7 is a block diagram illustrating a second embodiment of the invention.

FIG. 7 illustrates a modified form of this invention, which is identical in basic construction with the example of FIG. 3, so that no detailed description will be made of its construction. In this case, however, the sampling circuit 13 is supplied with a video signal demodulated by the demodulator 9. Further, the sampling circuit 13 is supplied with a gate signal Cb (FIG. 8A) corresponding to the synchronizing signal separated by the sync separator 14. Accordingly, it will be seen that the signal derived at the output terminal of the sampling circuit 13 is a synchronizing signal of the demodulated video signal.

Figure 8B:
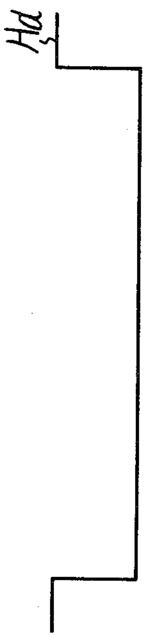
Figure 8C:

In the case where the reproduced signals $P_1'$ and $P_2'$ are correctly phased 90° apart as depicted in FIGS. 2D and 2E, the duty factor of the composite signal $S'_{FM}$ derived from the combining circuit 8 is 50 percent and no carrier leak is contained in a horizontal synchronizing signal Hd (FIG. 8B) of the video signal demodulated by the demodulator 9. Consequently, the output from the sampling circuit 13 is zero and the control signals derived from the differential amplifier 18 are equal in level to each other and the delay means 12*a* and 12*b* are retained in their normal conditions. However, if the phase of the reproduced signal $P_2''$ is in excess of the predetermined one, the duty factor of the composite signal $S''_{FM}$ is not 50 percent as shown in FIG. 2G. As a result of this, a carrier leak C1 appears in the horizontal synchronizing signal of the demodulated video signal as shown in FIG. 8C. The level of this carrier leak is proportional to the phase error. The carrier leak C1 is detected by the sampling circuit 13, after which the same operations as those previously described in connection with FIG. 3 are carried out, thereby to adjust the phase relation between the reproduced signals so as to remove the carrier leak. It will be understood that the working level of the differential amplifier 18 included in the phase difference detecting means shown in FIG. 7 is different from that in FIG. 3 due to the difference in the detecting signal used.

It will be apparent that many modifications and variations may be effected without departing from the scope of the novel concepts of this invention.

I claim as my invention

1. A video signal phase regulating system comprising:

a. a plurality of transmitting means for transmitting first and second pulse signals respectively, said first and second pulse signals being angular-modulated and derived from an angular-modulated video signal which contains a synchronizing signal, the pulses of said first pulse signal each having a pulse width which is the same as the interval between the leading edges of the pulses of said video pulse signal and the pulses of said second pulse signal each having a pulse width which is the same as the interval between the trailing edges of the pulses of said video pulse signal, said first and second pulse signals being initially synchronized with said video pulse signal and having a predetermined phase relationship between them, b. variable delay means having an input and an output, said input being connected to at least one of said transmitting means, c. means connected to said output of said variable delay means for combining said first and second pulse signals to provide a composite signal, d. means for sampling that portion of said composite signal corresponding to said synchronizing signal contained in said video pulse signal to provide an error signal when the predetermined phase relationship between said first and second pulse signals changes, and e. means for producing at least one control signal in accordance with said error signal to control said variable delay means in response to said control signal to adjust said first and second pulse signals to be of the predetermined phase relationship.

2. A video signal phase regulating system as claimed in claim 1, further comprising a demodulator responsive to said composite signal for producing a demodulated video signal and wherein said sampling means includes means responsive to said demodulated video signal for separating a synchronizing signal contained in said demodulated video signal, means responsive to and gated by said synchronizing signal for extracting a third signal from said composite signal representative of said synchronizing signal, and means responsive to said third signal for producing said error signal.

3. A video signal phase regulating system as claimed in claim 1, further comprising a demodulator responsive to said composite signal for producing a demodulated video signal and wherein said sampling means includes means responsive to said demodulated video signal for separating a synchronizing signal contained in said demodulated video signal, means responsive to and gated by said synchronizing signal for detecting a carrier leak contained in the synchronizing signal portion of said demodulated video signal and for producing a signal representative of said carrier leak, and means responsive to said representative carrier leak signal for producing said error signal.

4. A video signal phase regulating system as claimed in claim 1, wherein each of said plurality of transmitting means is provided with delay means.

5. A video signal phase regulating system as claimed in claim 4, wherein said control signal producing means includes a differential amplifier having differential output signals which differentially control each pair of said variable delay means.

6. A video signal phase regulating system as claimed in claim 5, wherein each of said variable delay means comprises means responsive to a separate one of said angular-modulated first and second pulse signals for producing a substantially saw-tooth wave signal, trigger means responsive to said sawtooth wave signal for producing a rectangular wave signal having a duration proportional to the time during which the sawtooth wave signal exceeds a variable trigger voltage level, and means responsive to said control signal for varying the trigger voltage level of said rectangular wave signal producing means in proportion to the amount of change of said control signal.

* * * * *